Oct. 6, 1931.  J. A. BUTKUS  1,826,419
FURNITURE CORNER CONSTRUCTION
Filed Aug. 24, 1927   3 Sheets-Sheet 1
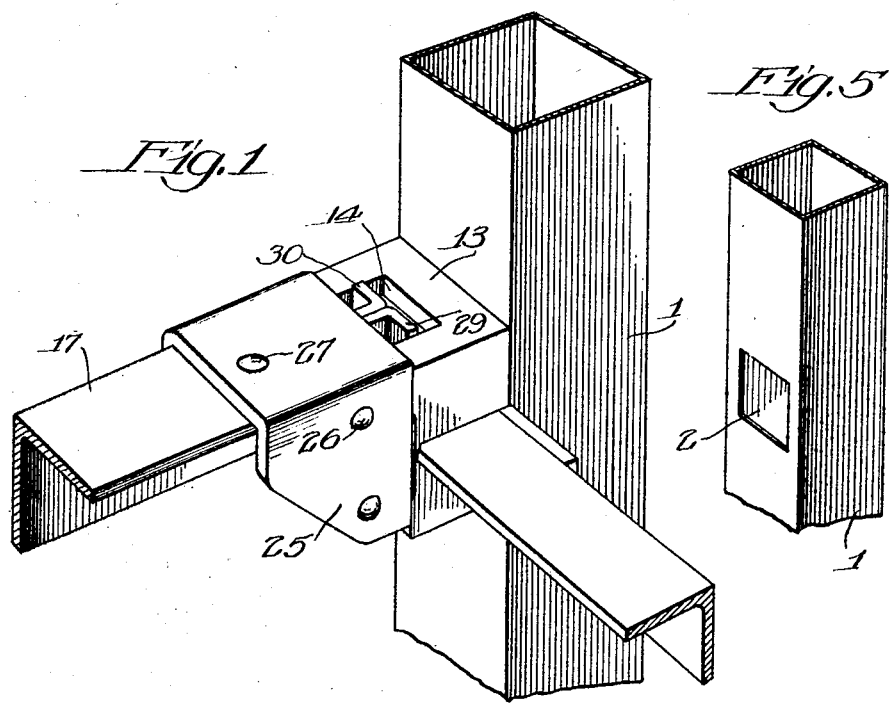
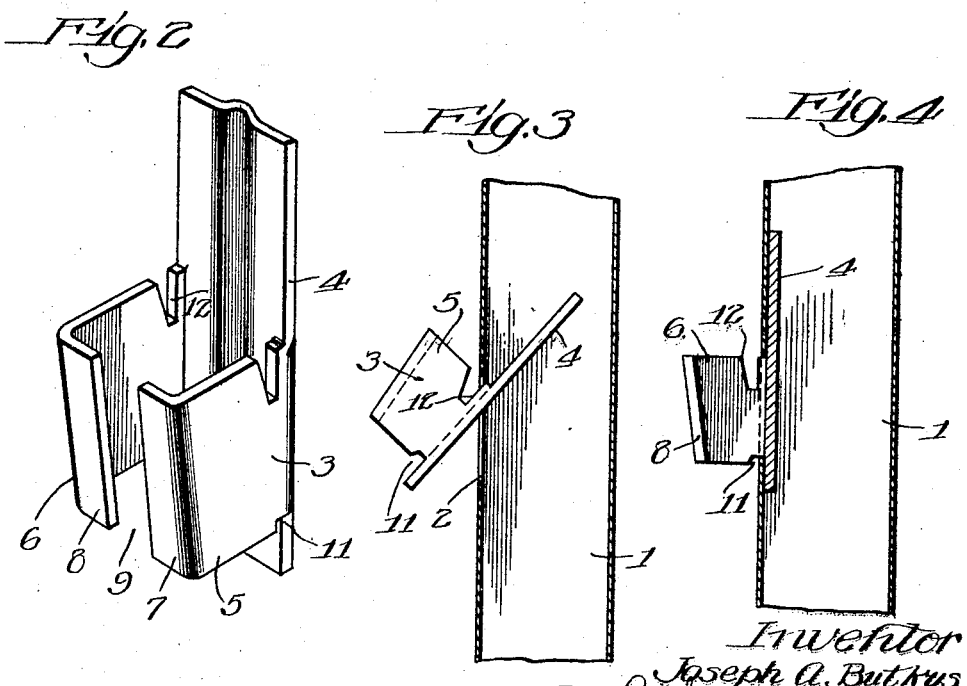
Inventor
Joseph A. Butkus
By Parker & Carter Attys Oct. 6, 1931.  J. A. BUTKUS  1,826,419
FURNITURE CORNER CONSTRUCTION
Filed Aug. 24, 1927  3 Sheets-Sheet 2
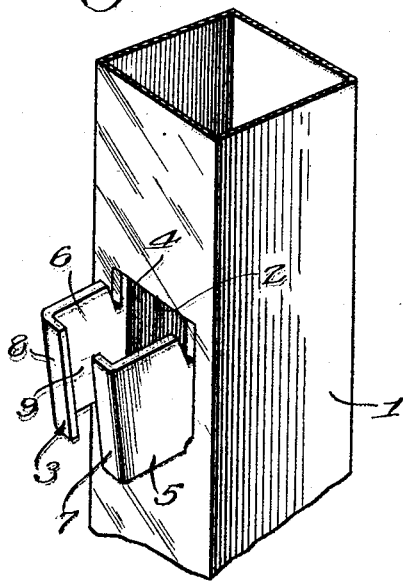
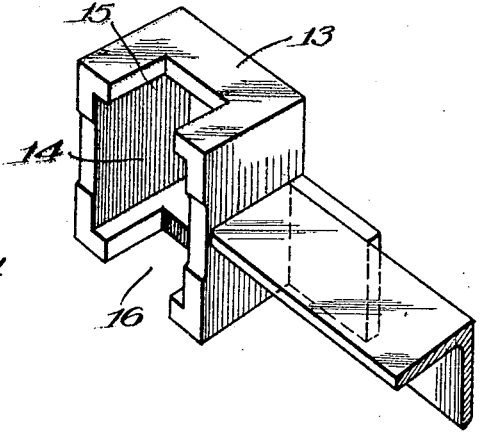
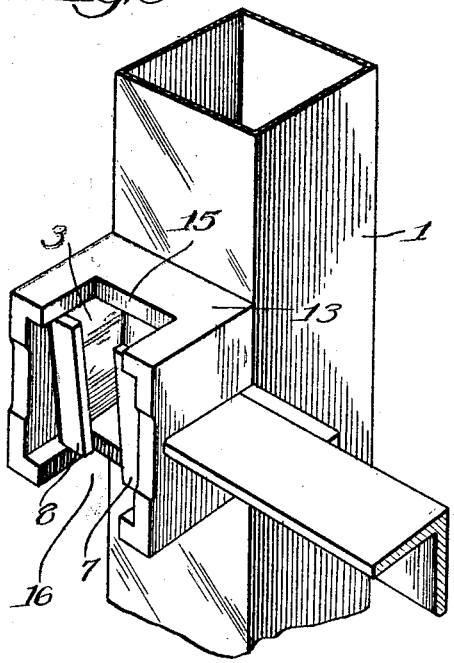
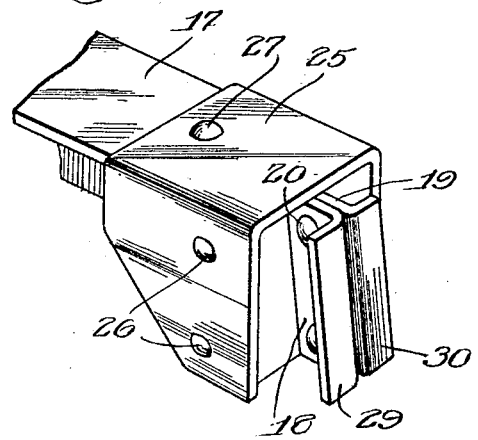
Inventor
Joseph A. Butkus
By Parker & Carter
Attys Oct. 6, 1931.                J. A. BUTKUS                1,826,419
                      FURNITURE CORNER CONSTRUCTION
                 Filed Aug. 24, 1927        3 Sheets-Sheet 3
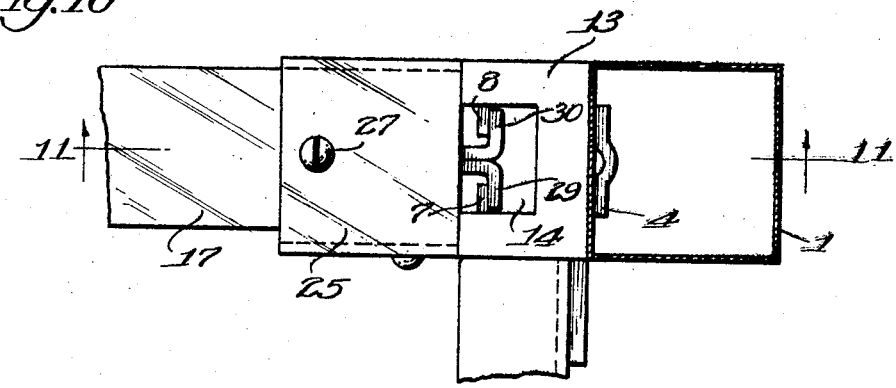
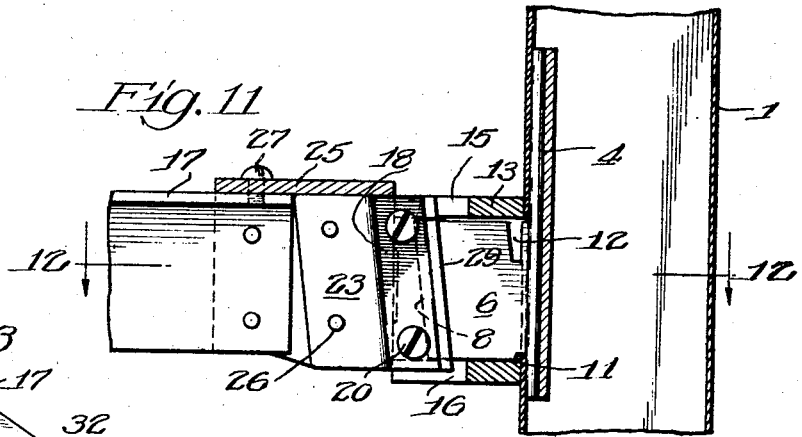
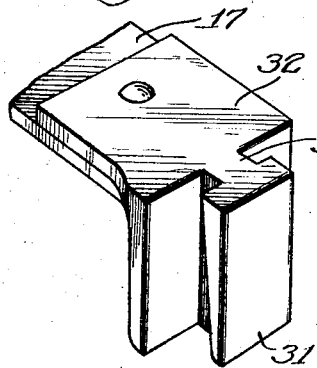
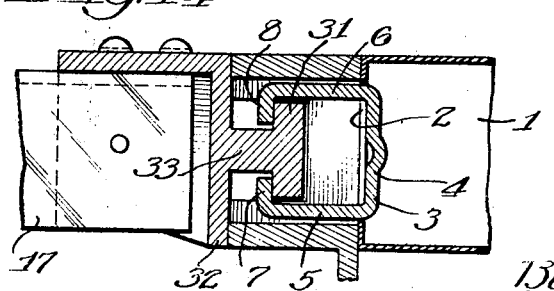
Inventor:
Joseph A. Butkus
By Parker & Carter Attys.

Patented Oct. 6, 1931

1,826,419

UNITED STATES PATENT OFFICE

JOSEPH A. BUTKUS, OF CHICAGO, ILLINOIS, ASSIGNOR TO GUSTAVUS A. E. KOHLER, OF CHICAGO, ILLINOIS

FURNITURE CORNER CONSTRUCTION

Application filed August 24, 1927. Serial No. 215,076.

This invention relates to improvements in furniture corner construction and has for its object to provide a new and improved construction of this description.

The invention has as a further object to provide a simple, cheap and efficient corner construction for furniture which shall have few parts and by means of which the construction can be easily assembled and disassembled.

The invention has as a further object to provide a corner construction wherein the principal connecting pieces can be stamped on sheet metal by means of dies.

The invention has further objects which are more particularly pointed out in the accompanying description.

Referring now to the drawings, Fig. 1 is a perspective view of one form of device embodying the invention.

Fig. 2 is a perspective view of the support connecting member.

Fig. 3 is a sectional view showing the method of connecting the support connecting member with the support.

Fig. 4 is a sectional view similar to Fig. 3 showing the support connecting member in position.

Fig. 5 is a perspective view of one of the supports before the support connecting member is connected therewith.

Fig. 6 is a view of one of the supports with the support connecting member in position.

Fig. 7 is a perspective view of the cross bar connecting member.

Fig. 8 is a perspective view showing the support connecting member and cross bar connecting member in position.

Fig. 9 is a perspective view showing the rail connecting member.

Fig. 10 is a plan view of the device illustrated in Fig. 1.

Fig. 11 is a sectional view taken on line 11—11 of Fig. 10.

Fig. 12 is a sectional view taken on line 12—12 of Fig. 11.

Fig. 13 is a perspective view showing the clamping device of the rail connecting member as a cast member.

Fig. 14 is a sectional view similar to Fig. 12 showing the cast connecting member of Fig. 13 substituted for the sheet metal member.

Like numerals refer to like parts throughout the several figures.

Referring now to the drawings which illustrate one form of the invention particularly adapted for use with beds, there is shown a corner support 1 which is indicated as being hollow. This support is provided at one side with an opening 2. Removably attached to the support is a support connecting member 3 which as shown is made of sheet metal cut and formed into shape by suitable dies. This support connecting member consists of the inner piece 4 adapted to be inserted through the opening 2 and which engages the inner face of the support 1. Connected with the inner piece 4 are the wedge engaging pieces consisting of the parts 5 and 6 bent at an angle to the piece 4 and which have their ends 7 and 8 bent toward each other so as to form opposing parts with a slot 9 between them.

These wedge engaging parts are so shaped as to form a wedge shaped opening between the parts 8 and 9, being nearer the part 4 at the bottom than at the top. The parts 5 and 6 are provided with notches 11 and 12 to facilitate the insertion of the part 4 in the opening 2. When this part 4 is being inserted in the opening 2, the portion of the support at the upper edge of the opening enters the notch 12 as shown in Fig. 3. The distance from the bottom of the notch 12 to the bottom of the part 4 is such that when the portion of the member 1 at the top of the opening 2 is in contact with the bottom of the notch 12, the piece 4 may be pushed through the opening 2. The device is then lowered so that the portion of the support 1 at the bottom of the opening 2 enters the notches 11 as shown in Fig. 4.

The cross bar connecting member 13 is provided with an opening 14 into which is received the wedge engaging pieces 5 and 6 of the support connecting member and in assembling the parts, the cross bar connecting member is slipped over the pieces 5 and 6 as shown in Fig. 8. This cross bar connecting member is shown as hollow and is open at the front and is provided at the top and bottom with the openings 15 and 16. The rail connecting member which connects the rail 17 with the support 1 consists of two sheet metal pieces 18 and 19 connected together between their ends by one or more fastening devices 20, (see Fig. 12), the ends thereof nearest the rail 17 having laterally bent portions 21 and 22 and the end portions 23 and 24 bent substantially parallel with the middle portions 18 and 19. The end portions 23 and 24 are fastened to the part 25 by suitable fastening devices 26 and the part 25 is attached to the rail 17 by the fastening devices 27 and 28. The pieces 18 and 19 have at their other ends the laterally bent portions 29 and 30 which are inclined being more widely separated from the piece 25 at the bottom thereof than at the top. The laterally bent ends 29 and 30 of the rail connecting member are inserted in the opening 15 at the top of the cross bar connecting member and engage the parts 7 and 8 of the support connecting member, (see Fig. 2). In view of the inclination of the engaging faces of the parts 7 and 8 and 29 and 30, a wedge action is secured which forces the edges of the piece 25 against the edges of the cross bar connecting member 13, as shown in Fig. 12.

It will, therefore, be seen that this construction is made up of three members and that both the support connecting member and the rail connecting member are made of sheet metal cut and shaped by means of dies. This makes a cheap, strong and effective construction which may be easily and quickly assembled and disassembled. Instead of having the rail connecting member made of sheet metal, it may be cast as shown in Fig. 13 and in this construction the wedge piece 31 is connected with the body portion 32 by the reduced portion 33 and is placed in position in the same manner, as the rail connecting member of Fig. 9.

When in position the wedge piece 31 engages the inner faces of the pieces 7 and 8 and forces the body portion 32 against the edges of the cross bar connecting member as shown in Fig. 14.

The use and operation of my invention are as follows:

In assembling the parts, the support connecting member 3 is connected with the support 1 by inserting the end of the piece 4 in the opening 2 as shown in Fig. 3 and moving it upwardly until the edge of the member 1 above the opening 2 passes into the notches 12. The lower end of the piece 4 is then moved inwardly through the opening 2 and lowered to the position shown in Fig. 4. The cross bar connecting member 13 is then placed in position over the support connecting member as shown in Fig. 8. The pieces 29 and 30 of the rail connecting member are then inserted in the opening 15 of the cross bar connecting member 13 and pushed downwardly to the position shown in Figs. 1 and 12, thus tightly forcing the edges of the part 25 against the edges of the cross bar connecting member.

The cross bar and the rail are now firmly connected with the support 1. Any weight on the rail simply tends to more tightly connect the parts together. When it is desired to disassemble the parts, the rail 17 is moved upwardly so as to move the parts 29 and 30 out of engagement with the parts 7 and 8 and disconnect such parts. The cross bar connecting member is then moved outwardly so as to disconnect it from the support connecting member 33. The support connecting member is then removed from the support 1 by lifting it upwardly and moving the lower end outwardly as shown in Fig. 3. The parts are assembled and disassembled in the same manner when the construction of Fig. 13 is used.

I claim:

1. A furniture corner construction comprising a hollow support having an opening in one side thereof, a support connecting member having a part adapted to be inserted in said opening and a part which projects from the opening, said support connecting member consisting of metal of substantially uniform thickness comprising a body portion longer than the opening in the hollow support and when in position engaging the hollow support beyond the opening and parts integral with the body portion and extending substantially at right angles thereto, the ends of said parts extending inwardly substantially at right angles to said parts and being separated by a space, a rail, a rail connecting member connected with said rail, said rail connecting member consisting of two sheet metal pieces connected together between their ends, one end of each sheet metal piece being bent laterally and adapted to engage the inwardly extending ends of the support connecting member, the other ends of said sheet metal pieces being substantially parallel with the middle portions thereof and being connected with the middle portions thereof by portions bent substantially at right angles thereto, and a connecting piece to which said latter ends are connected, said connecting piece being connected with said rail.

2. A furniture corner construction comprising a hollow support having an opening in one side thereof, a support connecting member having a part adapted to be inserted in said opening and a part which projects from the opening, said support connecting member consisting of metal of substantially uniform thickness comprising a body portion and parts integral with the body portion and extending substantially at right angles thereto, the ends of said parts extending inwardly substantially at right angles to said parts and being separated by a space, a rail, a rail connecting member connected with said rail and having a portion which extends through the opening between said inwardly extending ends, said rail connecting member having outwardly extending ends which engage the inner faces of the inwardly extending ends of the support connecting member, a cross bar connecting member having a top and a bottom and being provided at its top and bottom with openings into which the laterally bent ends of said rail connecting member are inserted in assembling the device.

3. A furniture corner construction comprising a hollow support having an opening in one side thereof, a support connecting member having a part adapted to be inserted in said opening and projecting parts which project from the opening, a rail, a rail connecting member connected with said rail comprising two metal pieces connected together near their ends, one end of each piece extending laterally and engaging the engaging pieces of the support connecting member, the portions of said metal pieces near the points where they are connected together extending laterally substantially at right angles to the parts of said pieces which are connected together, the ends of said pieces connected with said laterally bent portions extending at an angle thereto and substantially parallel with the portions of said pieces where they are connected together, a connecting piece with which said latter ends are connected, said connecting pieces connected with said rail.

Signed at Chicago, county of Cook and State of Illinois, this 28th day of May, 1927.

JOSEPH A. BUTKUS.